United States Patent
Liu et al.

(10) Patent No.: US 9,420,149 B2
(45) Date of Patent: Aug. 16, 2016

(54) INTEGRATED DEPTH CAMERA

(71) Applicants: Ling-Wei Liu, Taipei (TW); Hung-Chang Tsai, Taipei (TW)

(72) Inventors: Ling-Wei Liu, Taipei (TW); Hung-Chang Tsai, Taipei (TW)

(73) Assignee: LIPS CORPORATION, Taipei (TW)

( * ) Notice: Subject to any disclaimer, the term of this patent is extended or adjusted under 35 U.S.C. 154(b) by 209 days.

(21) Appl. No.: 14/458,298

(22) Filed: Aug. 13, 2014

(65) Prior Publication Data

US 2016/0050346 A1  Feb. 18, 2016

(30) Foreign Application Priority Data

Jun. 13, 2014 (TW) .............................. 103210475 U

(51) Int. Cl.
H04N 5/225 (2006.01)
H04N 13/02 (2006.01)
G06F 3/01 (2006.01)
G06K 9/00 (2006.01)

(52) U.S. Cl.
CPC .............. *H04N 5/2252* (2013.01); *G06F 3/017* (2013.01); *G06K 9/00335* (2013.01); *H04N 13/0253* (2013.01); *H04N 13/0271* (2013.01)

(58) Field of Classification Search
CPC .......... H04N 13/0253; H04N 13/0271; H04N 2013/0081; H04N 5/2252; H04N 5/2254; H04N 2213/003; G01S 17/08; G06F 3/005
USPC ............................................. 348/46, 373, 374
See application file for complete search history.

(56) References Cited

U.S. PATENT DOCUMENTS

| 9,294,754 B2 * | 3/2016 | Billerbeck | H04N 13/0203 |
| 2003/0062413 A1 * | 4/2003 | Gardiner | G06K 7/10732 235/454 |
| 2009/0020687 A1 * | 1/2009 | Lehmann | G01S 7/4816 250/208.1 |
| 2009/0122394 A1 * | 5/2009 | Son | H04N 5/2257 359/353 |
| 2010/0039500 A1 * | 2/2010 | Bell | H04N 13/0253 348/46 |
| 2010/0060722 A1 * | 3/2010 | Bell | G06F 3/017 348/51 |
| 2011/0139876 A1 * | 6/2011 | Chen | G06K 7/10722 235/470 |
| 2013/0335560 A1 * | 12/2013 | Higashiura | G01S 17/08 348/140 |
| 2014/0110485 A1 * | 4/2014 | Toa | G06K 7/10821 235/462.21 |
| 2014/0160300 A1 * | 6/2014 | Hung | H04N 5/33 348/164 |
| 2014/0160459 A1 * | 6/2014 | Huber | G01S 17/08 356/5.01 |
| 2015/0054001 A1 * | 2/2015 | Oganesian | H04N 5/2256 257/82 |
| 2015/0229912 A1 * | 8/2015 | Masalkar | G01S 7/481 348/46 |

* cited by examiner

*Primary Examiner* — John Villecco

(57) ABSTRACT

The depth camera includes a control module and a lighting module. The control module includes a control board, a control unit mounted on the control board, a seat mounted on the control board and over the control unit and a lens rooted in the seat. The lighting module is superposed on the control module and includes a lighting board with a through hole for receiving the lens, lighting units mounted on the lighting board and a reflector set composed of a base plate and reflectors formed thereon. Each reflector has an opening surrounding one of the lighting units.

6 Claims, 4 Drawing Sheets

INTEGRATED DEPTH CAMERA

BACKGROUND OF THE INVENTION

1. Technical Field

The invention relates to cameras, particularly to depth cameras.

2. Related Art

A depth camera can be used to control a computer through a gesture. Moreover, a depth camera can be further used to control a TV game through a body motion. This makes human-machine interaction more intuitive.

Such human-machine interaction needs a depth camera which can store a three-dimensional image into a two-dimensional format. A depth camera can measure a Z-axis distance between every shot point and the camera so that it can record three-dimensional image data.

A common method for measuring the Z-axis distance is to use the principle of time of flight (TOF). Simply speaking, a time period from a light beam emitted by a light source to be reflected by a shot point to come back to the origin can be used to calculate the Z-axis distance.

Therefore, the light source is an essential element of the TOF principle. A conventional TOF depth camera is provided with multiple light sources. To ensure the light beams from the light sources are absolutely parallel, each light source is further provided with a reflector. However, the reflectors are separate parts which must be individually installed over the light sources. Such installation always makes the light beams deflective, and finally, the distance measurement will be inaccurate.

SUMMARY OF THE INVENTION

An object of the invention is to provide an integrated depth camera, which has a modularized light source set. This can simplify the installation process of the light source set and ensure the accuracy of installation.

To accomplish the above object, the depth camera of the invention includes a control module and a lighting module. The control module includes a control board, a control unit mounted on the control board, a seat mounted on the control board and over the control unit and a lens rooted in the seat. The lighting module is superposed on the control module and includes a lighting board with a through hole for receiving the lens, lighting units mounted on the lighting board and a reflector set composed of a base plate and reflectors formed thereon. Each reflector has an opening surrounding one of the lighting units.

DETAILED DESCRIPTION OF THE INVENTION

Figure 1:
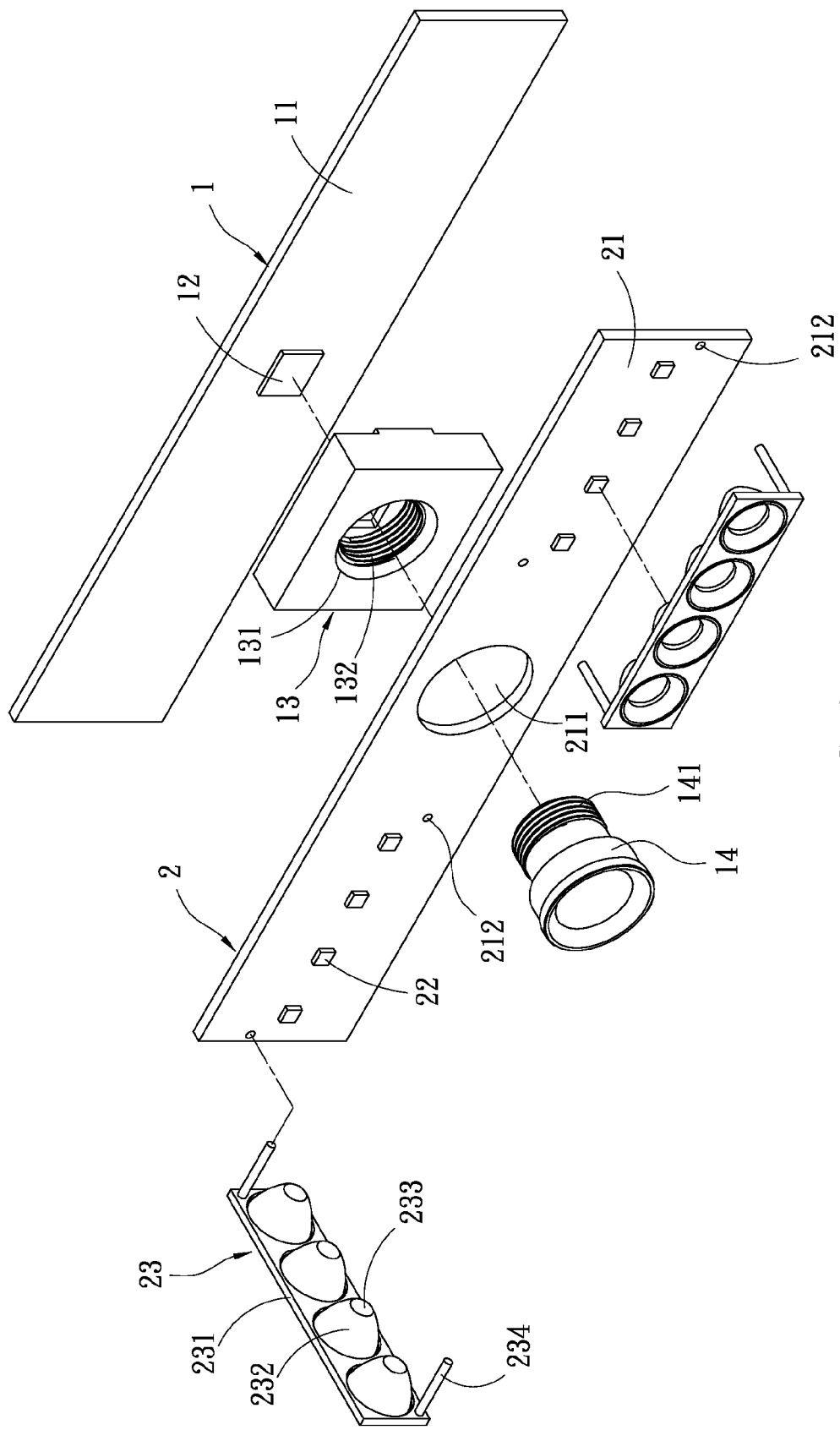
FIG. 1 is an exploded view of the invention.
Figure 2:
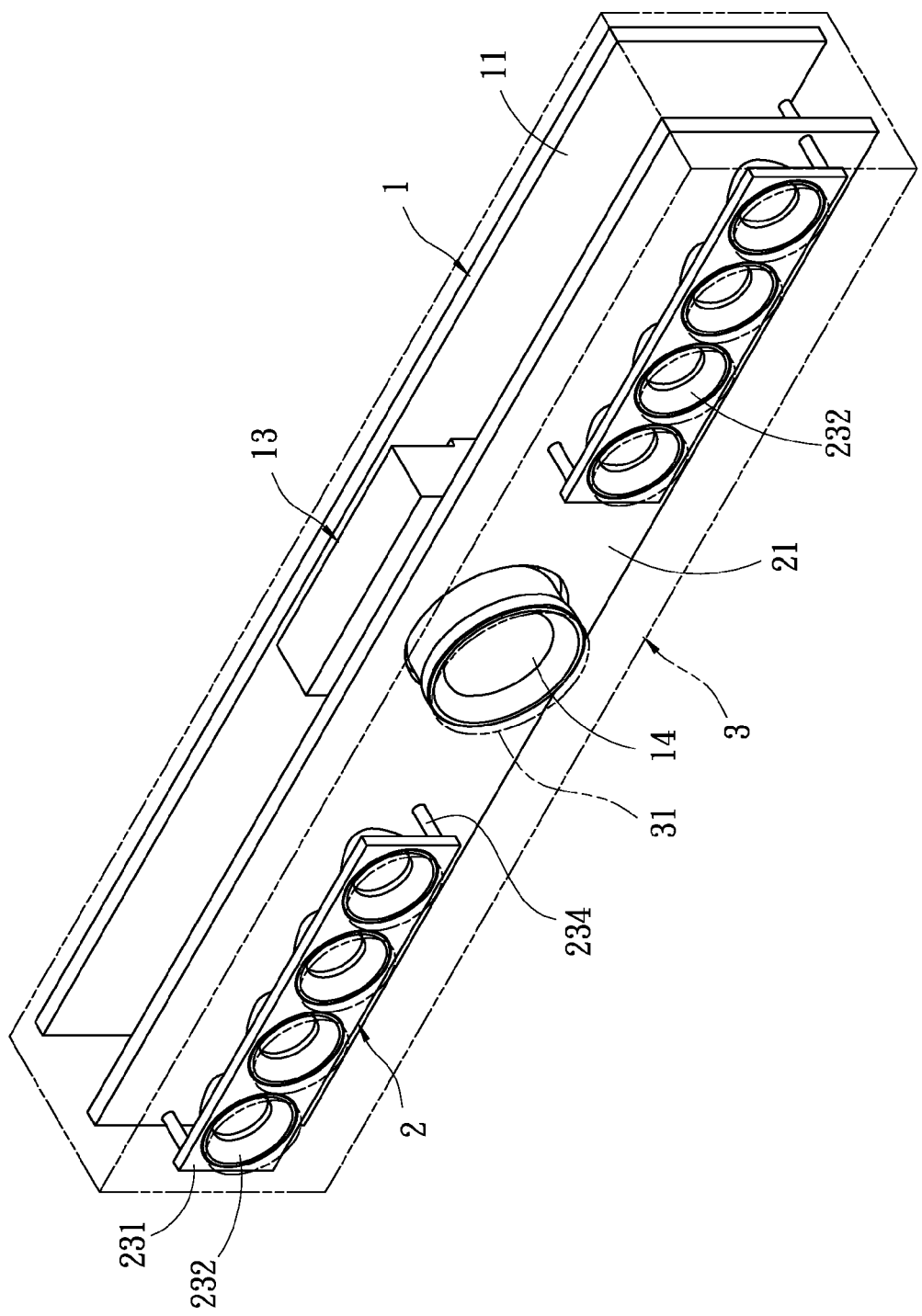
FIG. 2 is an assembled view of the invention.

Please refer to FIGS. 1 and 2. The depth camera of the invention includes a control module 1 and a lighting module 2. The control module 1 and the lighting module 2 are installed in a case 3. As shown in FIG. 2, the control module 1 further includes a control board 11. A control unit 12 is mounted on the control board 11. In the shown embodiment, the control unit 12 is a control chip for controlling the operation of the depth camera. A seat 13 is mounted on the control board 11. The seat 13 is formed with a connecting hole 131 surrounding the control unit 12. An edge of the connecting hole 131 is formed with a thread 132. A lens 14 is rooted in the connecting hole 131 and electrically connected to the control unit 12. The lens 14 has a connecting end 141 with a thread for screwing with the connecting hole 131.

Figure 3:
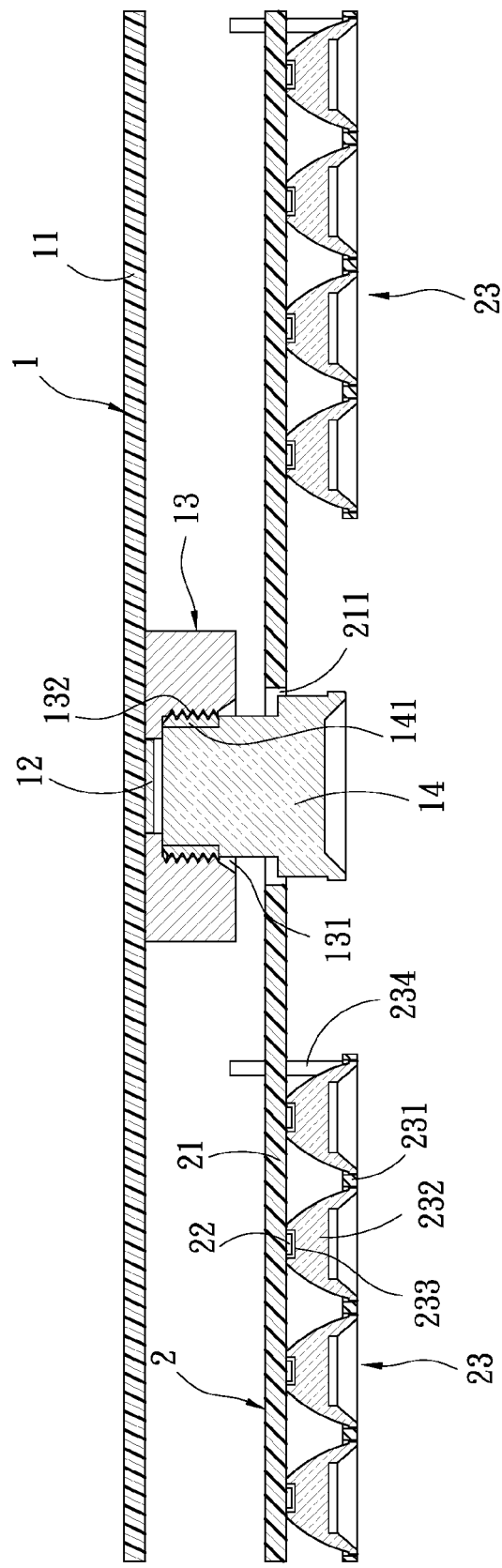
FIG. 3 is a sectional view of the invention.

The lighting module 2 includes a lighting board 21 electrically connected to the control board 11. The lighting board 21 is formed with a through hole 211 for receiving the lens 14. In other words, the lens 14 passes through the lighting board 21 as shown in FIG. 3. The lighting board 21 is mounted by multiple lighting units 22 under control of the control unit 21. The lighting units 22 are arranged in a line and beside the through hole 211. The lighting units 22 may be an infrared or laser light source. The lighting board 21 is provided with at least one reflector set 23. In the shown embodiment, the reflector set 23 is two in number. Each reflector set 23 includes a base plate 231 and multiple reflectors 232 mounted thereon. The bottom of each reflector 232 is formed with an opening 233 surrounding one of the lighting units 232. The base plate 231 is provided with fixing rods 234 for being inserted into fixing holes 212 of the lighting board 21. The lighting units 22 are separately surrounded by the reflectors 232 in a one-to-one manner as shown in FIG. 3.

Figure 4:
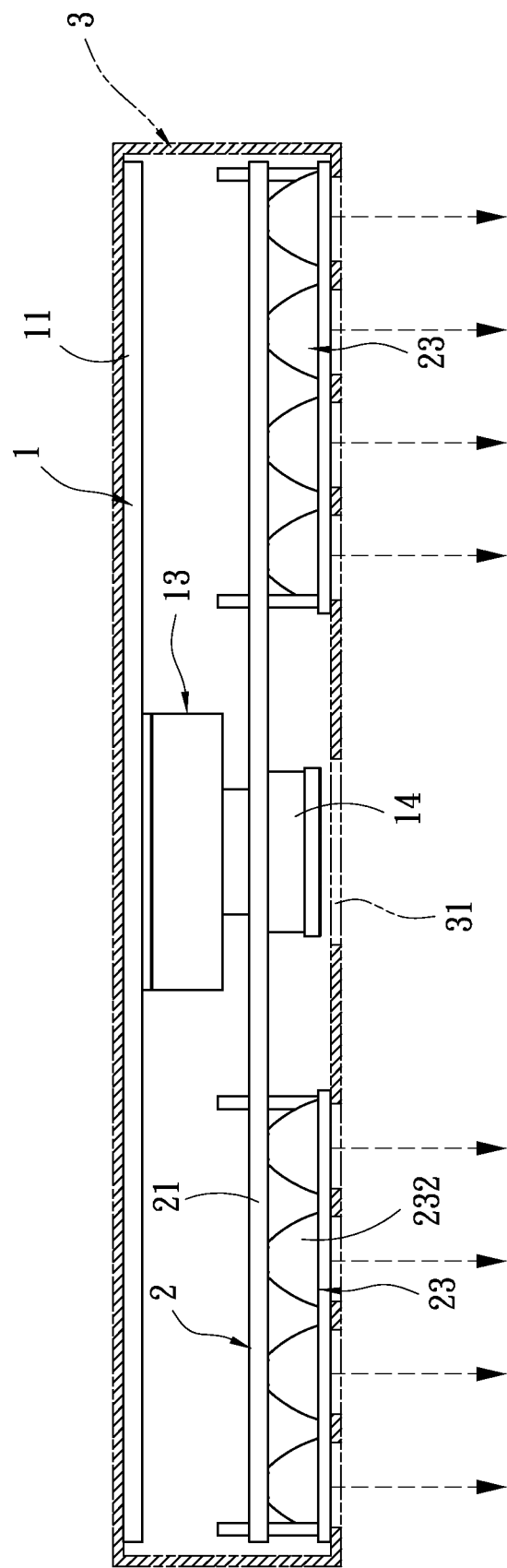
FIG. 4 is a schematic view of the invention.

Please refer to FIG. 4. As shown, the lighting units 22 of the lighting module 2 are installed with the reflectors 232 in a module manner. The lighting units 22 emit light beams while the depth camera is working, and the reflectors 232 can keep the light beams concentrative to reach the shot object (as the arrows shown in the figure). The modularized reflectors 23 ensure the installing accuracy and simplify the installing process.

It will be appreciated by persons skilled in the art that the above embodiment has been described by way of example only and not in any limitative sense, and that various alterations and modifications are possible without departure from the scope of the invention as defined by the appended claims. It will be appreciated by persons skilled in the art that the above embodiment has been described by way of example only and not in any limitative sense, and that various alterations and modifications are possible without departure from the scope of the invention as defined by the appended claims.

What is claimed is:

1. A depth camera comprising:
    a control module comprising:
        a control board;
        a control unit, mounted on the control board;
        a seat, mounted on the control board and over the control unit, and having a connecting hole surrounding the control unit; and
        a lens, rooted in the connecting hole of the seat; and
    a lighting module, superposed on and electrically connected to the control module, comprising:
        a lighting board, having a through hole for receiving the lens, and electrically connected to the control unit;
        lighting units, mounted on the lighting board; and
        a reflector set, having a base plate and multiple reflectors formed thereon, and each reflector having an opening surrounding one of the lighting units.

2. The depth camera of claim 1, wherein the base plate is provided with fixing rods, multiple fixing holes are formed in the lighting board so that the fixing rods are separately inserted into the fixing holes.

3. The depth camera of claim 1, wherein the lighting units are infrared or laser light sources.

4. The depth camera of claim 1, wherein the lens has a connecting end with a thread.

5. The depth camera of claim 4, wherein an edge of the connecting hole is formed with a thread for screwing with the connecting end.

6. The depth camera of claim 1, further comprising a case receiving the control module and the lighting module.

* * * * *